United States Patent
Daido et al.

(10) Patent No.: US 8,726,923 B2
(45) Date of Patent: May 20, 2014

(54) SAFETY VALVE

(75) Inventors: Kunihiko Daido, Osaka (JP); Toshio Kita, Osaka (JP)

(73) Assignee: Fujikin Incorporated, Osaka-Shi (JP)

( * ) Notice: Subject to any disclaimer, the term of this patent is extended or adjusted under 35 U.S.C. 154(b) by 793 days.

(21) Appl. No.: 12/449,695

(22) PCT Filed: Feb. 13, 2008

(86) PCT No.: PCT/JP2008/052310
§ 371 (c)(1), (2), (4) Date: Aug. 21, 2009

(87) PCT Pub. No.: WO2008/102673
PCT Pub. Date: Aug. 28, 2008

(65) Prior Publication Data
US 2010/0078078 A1  Apr. 1, 2010

(30) Foreign Application Priority Data
Feb. 22, 2007  (JP) .................................. 2007-041562

(51) Int. Cl.
*F16K 17/40* (2006.01)
(52) U.S. Cl.
USPC .............................. 137/72; 137/79; 220/89.4
(58) Field of Classification Search
USPC ................ 137/70–74, 79, 467, 768; 220/89.4
See application file for complete search history.

(56) References Cited

U.S. PATENT DOCUMENTS

| 1,768,778 A | * | 7/1930 | Nelson | 122/504.1 |
| 4,727,903 A | * | 3/1988 | Sturgis et al. | 137/461 |
| 5,197,671 A | * | 3/1993 | Wass et al. | 236/92 C |

FOREIGN PATENT DOCUMENTS

| JP | 02-033460 A | 2/1990 |
| JP | 07-305780 A | 11/1995 |
| JP | 2002-188752 A | 7/2002 |
| JP | 2003-130299 A | 5/2003 |
| JP | 2004-263786 A | 9/2004 |

OTHER PUBLICATIONS

International Search Report mailed Mar. 11, 2008, issued on PCT/JP2008/052310.

* cited by examiner

*Primary Examiner* — John K Fristoe, Jr.
*Assistant Examiner* — Macade Brown
(74) *Attorney, Agent, or Firm* — Edwards Wildman Palmer LLP; James E. Armstrong, IV; George N. Chaclas

(57) ABSTRACT

A safety valve coupled to a container to release liquid within the container. The container defines an opening surrounded by a container surface. The safety valve includes a housing defining an interior containing a fusible member for actuating a plug between a closed position and an open position to release the liquid upon melting the fusible member. A main body has a first end for coupling to the housing and a second end for coupling to the opening of the container. The main body second end includes a main body surface defining axial bores for receiving screws to fix the main body to the housing. Upon coupling the safety valve to the container, a small gap is formed between the container surface and the main body surface to limit loosening of the screws.

4 Claims, 3 Drawing Sheets

SAFETY VALVE

This application is the U.S. national phase, pursuant to 35 U.S.C. §371, of international application No. PCT/JP2008/052310, published in Japanese on Aug. 28, 2008 as international publication No. WO 2008/102673 A1, which claims the benefit of Japanese Patent Application Ser. No. 2007-41562, filed Feb. 22, 2007, the disclosure of which applications are incorporated herein in their entireties by this reference.

TECHNICAL FIELD

The present invention relates to a safety valve and, more particularly, relates to a safety valve mounted to a container for releasing gas within the container if the temperature rises, in order to prevent a pressure within the container from rising excessively in the event of fire and the like.

BACKGROUND ART

For a hydrogen-gas tank in a fuel-cell vehicle, there is a need for a safety valve incorporating gas releasing means which includes a fusible member which fuses at higher temperatures and releases gas within a container along with the fusion of the fusible member, in order to prevent the tank from bursting due to a rise of an internal pressure thereof along with a rise of a temperature of the tank. Patent Document 1 discloses a safety valve which is structured to include a main body mounted to a container, a cylindrical-shaped housing coupled to the main body and the gas releasing means and to incorporate the gas releasing means by coupling male screw portions provided in the main body to female screw portions provided in the housing through screws, wherein the safety valve can be mounted to the container by coupling, through screws, male screw portions provided in the main body of the safety valve to female screw portions in the container.
Patent Document Japanese Unexamined Patent Publication No. 2004-263786

SUMMARY OF THE INVENTION

Problems to be Solved by the Invention

With the conventional safety valve mentioned above, if coupling between a main body and a housing through screws is loosened due to vibrations and the like, this may induce malfunctions of gas releasing means. Therefore, improvements for coping therewith have been a challenge.

Therefore, as illustrated in FIG. 3, in a safety valve (41) including a cylindrical-shaped housing (42), a cylindrical-shaped main body (43), a fusible member (7), a moving member (8), a biasing member (9), a movable plug member (10) and movable-plug-member holding means (11), it is possible to form a male screw portion (42a) on the outer periphery of the housing (42) and to form a female screw portion (43a) conforming thereto on the inner periphery of the main body (43) and, further, it is possible to further tighten a lock nut (44) on the male screw portion (42a) of the housing (42), in order to prevent the housing (42) and the main body (43) from being loosened. However, in this case, there are following problems.

Since the safety valve (41) is an apparatus to be mounted in a vehicle, the safety valve (41) is required to be light-weighted and compacted, and is also required to have an entirely reduced thickness for improving a temperature-sensing characteristic. Accordingly, the lock nut (44) cannot be tightened with a strong force, thereby it impossible to eliminate the possibility of loosening of the lock nut (44) due to vibrations. Further, in mounting the safety valve (41) to a container (T), if a torque wrench of a box-wrench type is used, it will interfere with diagonal corner portions of the lock nut (44), and, therefore, only a torque wrench of a spanner type can be used, which degrades the workability. Further, in disengaging the safety valve (41) from the container (T), the lock nut (44) may be loosened by mistake. If the safety valve (41) is again mounted to the container (T), in this state, the effect of preventing the loosening of the lock nut (44) is not provided.

It is an object of the present invention to provide a safety valve with improved safety which is to be mounted to a container for releasing gas within the container if the temperature rises.

A safety valve according to the present invention includes gas releasing means provided in a space formed by a main body mounted to a container and by a housing coupled to the main body, the gas releasing means including a fusible member which fuses at higher temperatures and being adapted to release gas within the container along with the fusion of the fusible member, wherein the main body and the housing are coupled to each other, through a plurality of male screw members which are inserted from a surface of an outer peripheral edge portion of the main body which is faced with the container and are screwed in female screw portions provided in the housing.

For example, the main body has a mounting portion inserted in an opening provided in the container and a large-diameter portion having an outer diameter larger than an outer diameter of the mounting portion, the housing is abutted, at a lower surface thereof, against an upper surface of the outer peripheral edge portion of the large diameter portion of the main body, the outer peripheral edge portion of the large-diameter portion of the main body is provided with a plurality of axial through holes; and the housing is provided, from the lower surface, with female screw portions conforming to the respective axial through holes.

Note that, in the present specification, the terms "upper" and "lower" regard as a reference a case where the safety valve is mounted to an upper surface of a container (FIG. 1), but these terms "upper" and "lower" are merely for convenience, and the safety valve can be mounted in an upside-down manner or laterally with respect to the reference state.

With the safety valve described in Patent Document 1 in which the male screw portion provided in the main body is coupled, through screwing, to the female screw portion provided in the housing, if the coupling through the screwing is loosened, this may induce a malfunction. However, with the safety valve according to the present invention, even if all the plurality of male screw members are loosened, no malfunction occurs. This is because the plurality of male screw members inserted from the lower surface of the large-diameter portion of the main body are restricted in slack allowance, since the large-diameter portion is structured and designed to be faced to the surface of the container, which prevents malfunctions.

As the gas releasing means provided within the space formed by the main body and the housing, it is possible to employ gas releasing means of various well-known types. The gas releasing means is adapted to include, in addition to a fusible member, a moving member which is moved along with the fusion of the fusible member, a biasing member for biasing the moving member, and a movable plug member which is opened along with the movement of the moving member to communicate the container with the outside of the safety valve, wherein the main body and the housing are both provided with portions constituting the gas releasing means.

Specifically, a safety valve including a gas releasing means is structured, for example, to include a cylindrical-shaped housing provided with an inward flange portion at an upper end portion thereof, a cylindrical-shaped main body having a small-diameter portion forming a gap between itself and the inner periphery of the housing, a large-diameter portion which is continuous with the lower end of the small-diameter portion and closes the opening at the lower end of the housing and a mounting portion which is continuous with the lower end of the large-diameter portion and is mounted to a container, a fusible member which is provided between the small-diameter portion of the main body and the housing such that the upper end surface of the fusible member comes into contact with the lower surface of the inward flange portion of the housing, a moving member which is movably provided between the small-diameter portion of the main body and the housing such that the upper end of the moving member comes into contact with the lower end of the fusible member, a biasing member which is provided between the small-diameter portion of the main body and the housing such that the upper end of the biasing member comes into contact with the lower end of the moving member and the lower end of the biasing member is received by the upper surface of the large-diameter portion of the main body, a cylindrical-shaped movable plug member with a step which is movably inserted in the main body, and movable-plug-member holding means which prevents the movable plug member from moving upwardly at a normal state while allowing the movable plug member to move upwardly due to the movement of the moving member to an upper position, wherein the main-body includes a small-diameter axial channel communicated with the inside of the container, and a large-diameter axial channel which is continuous with the upper end of the small-diameter axial channel and is opened at the upper end, the movable plug member includes a small-diameter axial portion fitted to the upper end portion of the small-diameter axial channel in the main body, an intermediate axial portion which is continuous with the small-diameter axial portion and has a gap between itself and the lower end portion of the large-diameter axial channel in the main body, and a large-diameter axial portion which is continuous with the intermediate axial portion and is slidably fitted to a middle portion of the large-diameter axial channel in the main body, the large-diameter axial portion of the movable plug member is provided with an axial channel extending from its upper end to its lower end, and the intermediate axial portion of the movable plug member is provided with communication channels which are opened at the peripheral surface thereof and are communicated with the lower end of the axial channel in the large-diameter axial portion, so that, if the fusible member fuses to move the moving member to the upper position, the gas within the container is discharged to the outside of the container, through the main-body small-diameter axial channel, the lower end portion of the main-body large-diameter axial channel, the movable-plug-member communication channels and the movable-plug-member axial channel. In such a safety valve, a pressure of the gas within the container is received by the movable plug member which is provided within the main body secured to the housing and is prevented from moving upwardly by the movable-plug-member holding means, which prevents the moving member from being subjected to the pressure within the container, thereby causing the fusible member to be subjected to only the elastic force of the biasing member. This can prevent malfunctions at temperatures lower than a set value, which significantly improves the safety of the portion of gas releasing means. Along therewith, it is important to take a countermeasure against the loosening of screws. By attaining improvement therefor, it is possible to provide a safety valve with extremely high reliability.

Effects of the Invention

With the safety valve according to the present invention, it is possible to substantially eliminate the possibility of loosening of coupling through screws, thereby preventing malfunctions due to loosening of screws, and it is also possible to eliminate the possibility of the screw members being loosened by mistake when disengaging the safety valve, thereby greatly improving the reliability. Further, since no lock nut is employed, it is possible to employ a torque wrench of a box-wrench type in mounting the safety valve to the container, which improves the workability.

Figure 1:
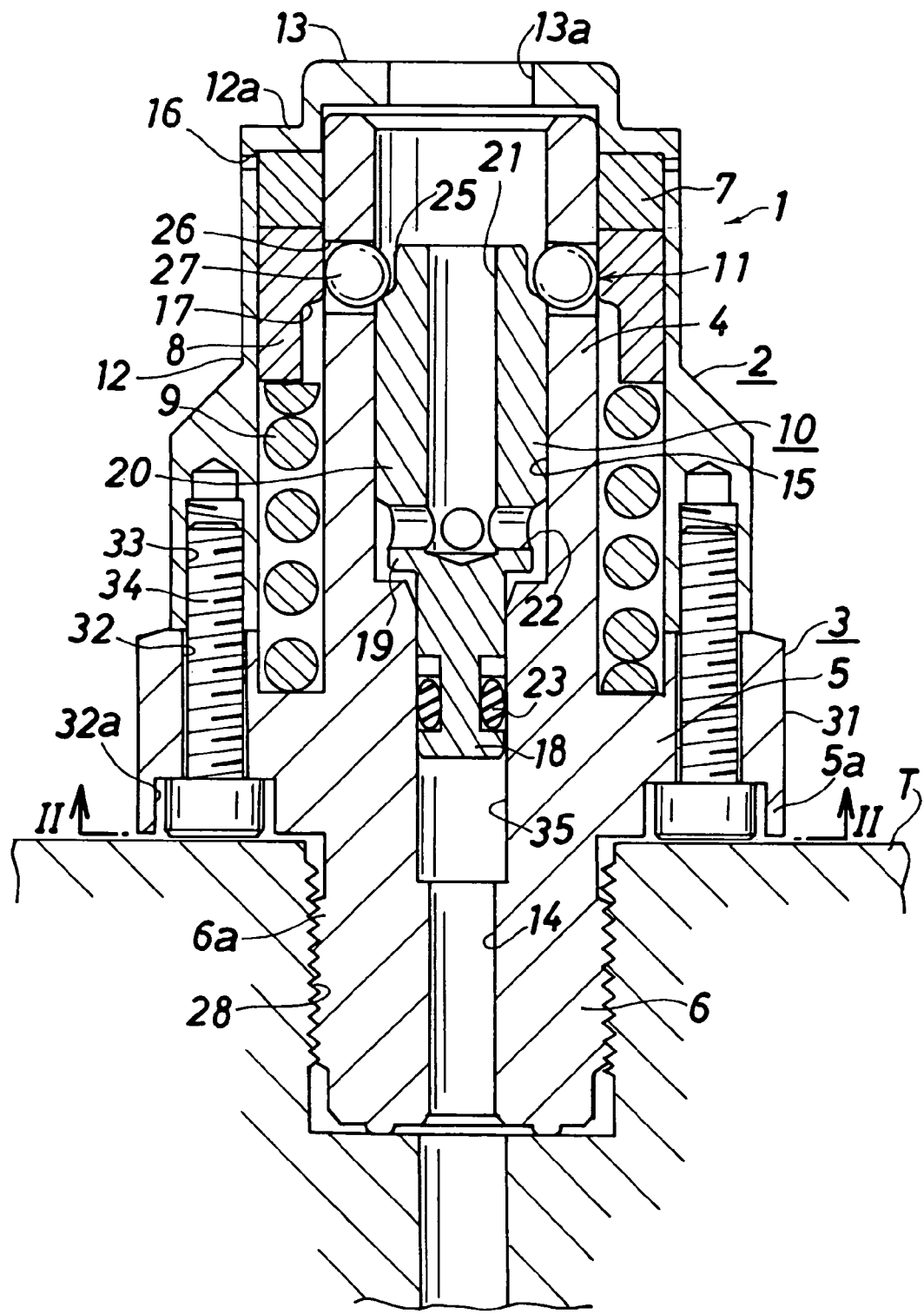
FIG. 1 is a cross-sectional view illustrating an embodiment of a safety valve according to the present invention, illustrating a normal state (a closed state).

DESCRIPTION OF THE REFERENCE NUMERALS (1) Safety valve
(2) Housing
(3) Main body
(5a) Outer peripheral edge portion
(7) Fusible alloy (fusible member)
(33) Female screw portion
(34) Male screw member
(T) Container

PREFERRED EMBODIMENTS FOR CARRYING OUT THE INVENTION

Hereinafter, an embodiment of the present invention will be described with reference to the drawings. In the following description, the terms "upper", "lower", "left" and "right" mean upper, lower, left and right portions of FIG. 1.

Figure 2:
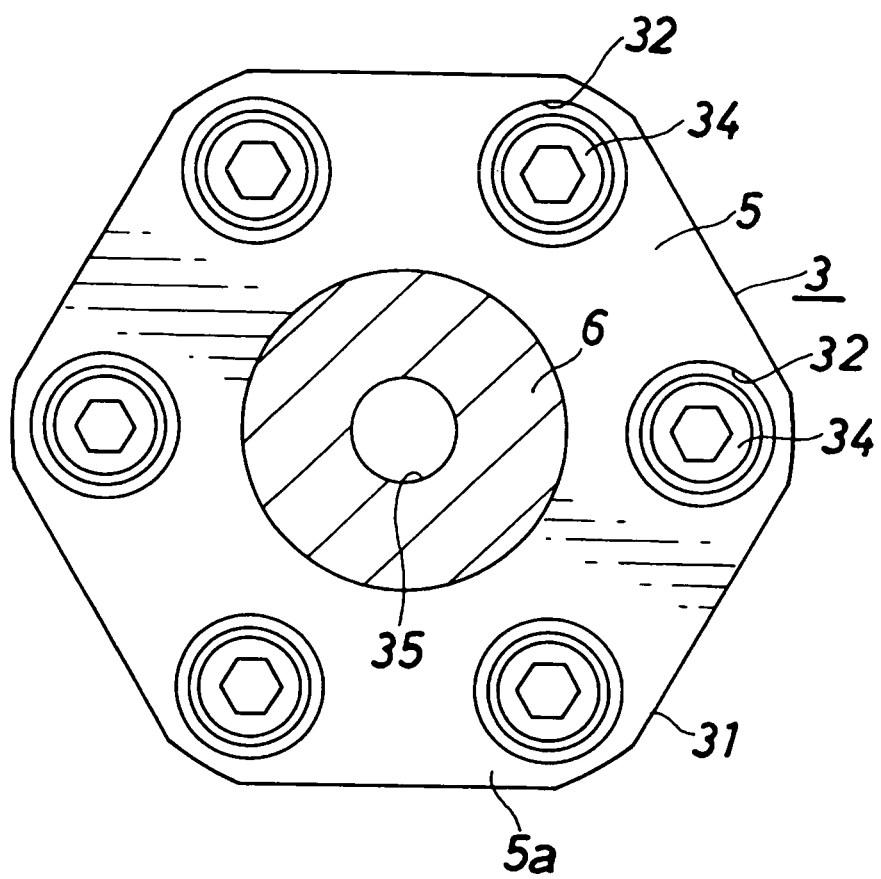
FIG. 2 is a cross-sectional view taken along line II-II in FIG. 1.

FIGS. 1 and 2 illustrate an embodiment of a safety valve according to the present invention. FIG. 1 illustrates a normal state where an ambient temperature around the safety valve is equal to or lower than a predetermined value, namely a state where a flow channel is closed.

As illustrated in FIG. 1, the safety valve (1) includes a housing (2) which is formed to have a cylindrical shape having a peripheral wall (12) and a top wall (13) and is provided with an inward flange portion (12a) at the upper end portion of the peripheral wall (12), a cylindrical-shaped main body (3) having a small-diameter portion (4) forming a gap between itself and the inner periphery of the housing (2), a large-diameter portion (5) which is continuous with the lower end of the small-diameter portion (4) and closes the opening at the lower end of the housing (2) and a mounting portion (6) which is continuous with the lower end of the large-diameter portion (5) and is mounted to a container (T), a cylindrical-shaped fusible alloy (fusible member) (7) which is provided between the upper end portion of the small-diameter portion (4) of the main body (3) and the upper end portion of the housing (2) such that the upper end surface of the fusible alloy (7) comes into contact with the lower surface of the inward flange portion (12a) of the housing (2), a cylindrical-shaped moving member (8) which is movably provided between a middle portion of the small-diameter portion (4) of the main body (3) and a middle portion of the housing (2) such that the upper end of the moving member (8) comes into contact with the lower end of the fusible alloy (7), a cylindrical-shaped coil spring (biasing member) (9) which is provided between the lower end portion of the small-diameter portion (4) of the main body (3) and near the lower portion of the housing (2) such that the upper end of the coil spring (9) comes into contact with the lower end of the moving member (8) and the lower end of the coil spring (9) is received by the upper surface of the large-diameter portion (5) of the main body (3), a cylindrical-shaped movable plug member (10) with a step which is movably inserted in the main body (3), and a movable-plug-member holding means (11) which prevents the movable plug member (10) from moving upwardly at a normal state while allowing the movable plug member (10) to move upwardly due to the movement of the moving member (8) to an upper position.

In the top wall (13) of the housing (2), there is formed a gas discharge channel (13a) for discharging gas within the housing (2) to the outside. The upper end of the small-diameter portion (4) of the main body (3) is faced to the lower surface of the top wall (13) of the housing (2) with a small gap interposed therebetween.

The mounting portion (6) of the main body (3) is formed to have a shape conforming to the shape of the safety-valve mounting portion of the container (T) and, in the present embodiment, the mounting portion (6) is provided with a male screw portion (6a) at the outer peripheral portion. The mounting portion (6) is inserted in an opening provided in the container (T) and is screwed in a female screw portion (28) provided therein, so that the safety valve (1) is mounted to the container (T). The large-diameter portion (5) of the main body (3) has an outer diameter larger than that of the mounting portion (6) and, at the state where the safety valve (1) is mounted to the container (T), the lower surface of the outer peripheral edge portion (5a) of the large-diameter portion (5) is faced to the surface of the container (T) with a small gap interposed therebetween. As illustrated in FIG. 2, an engagement portion (31) having a hexagonal cylindrical shape is formed on the outer periphery of the large-diameter portion (5) of the main body (3), so that mounting of the safety valve (1) to the container (T) can be attained by fitting a torque wrench of a box-wench type to the engagement portion (31) having the hexagonal cylindrical shape.

The housing (2) is abutted, at the lower surface thereof, against the upper surface of the outer peripheral edge portion (5a) of the large-diameter portion (5). A Plurality of axial through holes (32) (the number of which is 6 in the figure) are provided in the outer peripheral edge portion (5a) of the large-diameter portion (5). The housing (2) is provided, from the lower surface, with female screw portions (33) conforming to the respective axial through holes (32). Further, the main body (3) and the housing (2) are coupled to each other, through a plurality of male screw members (34) (the number of which is 6 in the figure) inserted from the lower surface of the outer peripheral edge portion (5a) of the large-diameter portion (5). The male screw members (34) are bolts each having a hexagonal-shaped hole, and the respective axial through holes (32) are provided at their lower end portions with large-diameter portions (32a) for housing the head portions of the bolts each having the hexagonal-shaped hole.

There is only a small gap between the lower surface of the outer peripheral edge portion (5a) of the large-diameter portion (5) and the surface of the container (T), as described above, and, similarly, there is a small gap between the lower surfaces of the male screw members (34) and the surface of the container (T). This provides an extremely small slack allowance in cases where the male screw portions (34) are loosened due to vibrations and the like.

The inner peripheral surface of the main body (3) is shaped, such that the small-diameter portion (4) has a larger diameter, the mounting portion (6) has a smaller diameter, and the large-diameter portion (5) has, at the inner periphery, a diameter which is intermediate therebetween. Consequently, the main body (3) is provided with a small-diameter axial channel (14) extending from the vicinity of the lower end of the large-diameter portion (5) to the lower end of the mounting portion (6) and is communicated with the inside of the container (T), an intermediate-diameter axial channel (35) which is continuous with the small-diameter axial channel (14) and extends upwardly, and a large-diameter axial channel (15) which is continuous with the intermediate-diameter axial channel (35), extends upwardly and is opened at the upper end.

The fusible alloy (7) is adapted such that it fuses if a pre-set temperature is reached. The housing (2) is provided at the upper end portion of the peripheral wall (12) with an alloy discharge channel (16) for discharging the fused alloy (7) to the outside.

The moving member (8) is provided between the housing (2) and the main body (3), such that it can slide at the state where the inner periphery thereof comes into contact with the outer periphery of the small-diameter portion (4) of the main body (3) and, also, the outer periphery thereof comes into contact with the inner periphery of the housing (2). Left and right ball-moving concave portions (17) are formed in the inner periphery of the lower end portion of the moving member (8).

The coil spring (9) biases the moving member (8) upwardly and, if the fusible alloy (7) is fused, the coil spring (9) causes the fusible alloy (7) to be discharged through the alloy discharge channel (16) in the housing (2) and, also, causes the moving member (8) to move upwardly. The elastic force of the coil spring (9) is set to a small value which enables moving the moving member (8) upwardly, in consideration of a flow characteristic and the like of the fusible alloy (7) at a set temperature which makes the safety valve (1) operable.

The movable plug member (10) has a small-diameter axial portion (18) fitted to the upper end portion of the intermediate-diameter axial channel (35) in the main body (3), an intermediate axial portion (19) which is continuous with the small-diameter portion (18) and forms a gap between itself and the lower end portion of the large-diameter axial channel (15) in the main body (3), and a large-diameter axial portion (20) which is continuous with the intermediate axial portion (19) and is slidably fitted in the large-diameter axial channel (15) in the main body (3).

The large-diameter axial portion (20) of the movable plug member (10) is provided with an axial channel (21) extending from its upper end to its lower end. The intermediate axial portion (19) of the movable plug member (10) is provided with left and right communication channels (22) which are opened at the outer peripheral surface thereof and are communicated with the lower end of the axial channel (21) in the large-diameter axial portion (20). Accordingly, the communication channels (22) are opened to the gap existing between the lower end portion of the large-diameter axial channel (15) in the main body (3) and the outer periphery of the intermediate axial portion (19).

Between the upper end of the large-diameter axial portion (20) of the movable plug member (10) and the lower surface of the top wall (13) of the housing (2), there is provided a predetermined gap for allowing the large-diameter axial portion (20) to move upwardly, and this gap is formed to be larger than the length of the small-diameter axial portion (18). Accordingly, if the movable plug member (10) is forcibly pushed upwardly by the pressure of the gas within the container (T), the movable plug member (10) stops at the position where its upper end comes into contact with the lower surface of the top wall (13) of the housing (2) and, at this time, the small-diameter axial channel (14) and the intermediate-diameter axial channel (35) in the main body (3) are communicated with the communication channels (22) in the movable plug member (10), through the lower end portion of the large-diameter axial channel (15) in the main body (3). An O ring (23) is provided in the outer periphery of the small-diameter axial portion (18) of the movable plug member (10).

The movable-plug-member holding means (11) is constituted by left and right concave portions (25) provided in the outer periphery of a portion of the movable plug member (10) near the upper end thereof, through holes (26) provided in the small-diameter portion (4) of the main body (3) at the same positions as the concave portions (25), balls (27) which are housed in the concave portion (25) and the through hole (26) in such a way as to straddle them, and the ball-moving concave portions (17) in the moving member (8). The ball-moving concave portions (17) are formed, such that they are faced with the through holes (26) when the fusible alloy (7) has been fused and the moving member (8) has been moved to an upper position.

The movement of the balls (27) in the radial direction is restricted by the bottom surfaces of the concave portions (25) in the movable plug member (10) and by the inner peripheral surface of the moving member (8). Accordingly, if an upward force acts on the movable plug member (10), the lower surfaces of the concave portion (25) in the movable plug member (10) exert obliquely-upward forces on the balls (27), while, against these forces, the upper surfaces of the through holes (26) in the main body (3) exert obliquely-downward forces on the balls (27), and, consequently, both the forces are balanced with each other. Thus, at a normal state, the balls (27) and, therefore, the movable plug member (10) are prevented from moving upwardly.

The ball-moving concave portions (17) are structures for allowing the movable plug member (10) to move upwardly through the movement of the moving member (8) to the upper position. In other words, if the moving member (8) is moved to the upper position, the ball-moving concave portions (17) are faced to the openings at the outer ends of the through holes (26) in the main body (3), which allows the balls (27), which have been prevented from moving outwardly in the radial direction by the inner periphery of the moving member (8), to move outwardly in the radial direction. The concave portions (25) in the movable plug member (10) are tapered, and forces having radially-outward components act on the balls (27), which causes the balls (27) to easily move outwardly in the radial direction. Consequently, the balls (27) are disengaged from the concave portions (25) in the movable plug member (10) and are housed in the through holes (26) and the ball-moving concave portions (17) such that the balls (27) straddle them, which cancels the effect of preventing the upward movement of the movable plug member (10). At this state, if the pressure of the gas within the container has exceeded the frictional force of the movable plug member (10), the movable plug member (10) moves upwardly. Thus, if the moving member (8) moves to the upper position, the movable plug member (10) moves upwardly immediately thereafter.

If the ambient temperature around the safety valve (1) exceeds a predetermined value, the fusible alloy (7) fuses, which brings the safety valve (1) into an operative state. In the safety valve (1) at the operative state, the fusible alloy (7) is discharged through the alloy discharge channel (16) and thus is erased therefrom, which causes the moving member (8) being biased by the coil spring (8) to move to the upper position. The upper position of the moving member (8) is the position where the upper end of the moving member (8) comes into contact with the lower surface of the inward flange portion (12a) of the housing (2). When the moving member (8) has been moved to the upper position, as described above, nothing prevents the upward movement of the movable plug member (10), which causes the movable plug member (10) to move to the upper position. The upper position of the movable plug member (10) is the position where the upper end thereof comes into contact with the lower surface of the top wall (13) of the housing (2). This causes the small-diameter axial portion (18) of the movable plug member (10), which has closed the intermediate-diameter axial channel (35), to be pushed upwardly into the large-diameter axial channel (15), thereby forming, in the safety valve (1), an open channel for discharging the gas within the container (T). In other words, if the fusible alloy (7) fuses to move the moving member (8) to the upper position, the gas within the container (T) is discharged through the gas discharge channel (13a) provided in the top wall (13) of the housing (2), through the main-body small-diameter axial channel (14), the main-body intermediate-diameter axial channel (35), the lower end portion of the main-body large-diameter axial channel (15), the movable-plug-member communication channels (22) and the movable-plug-member axial channel (21).

Figure 3:
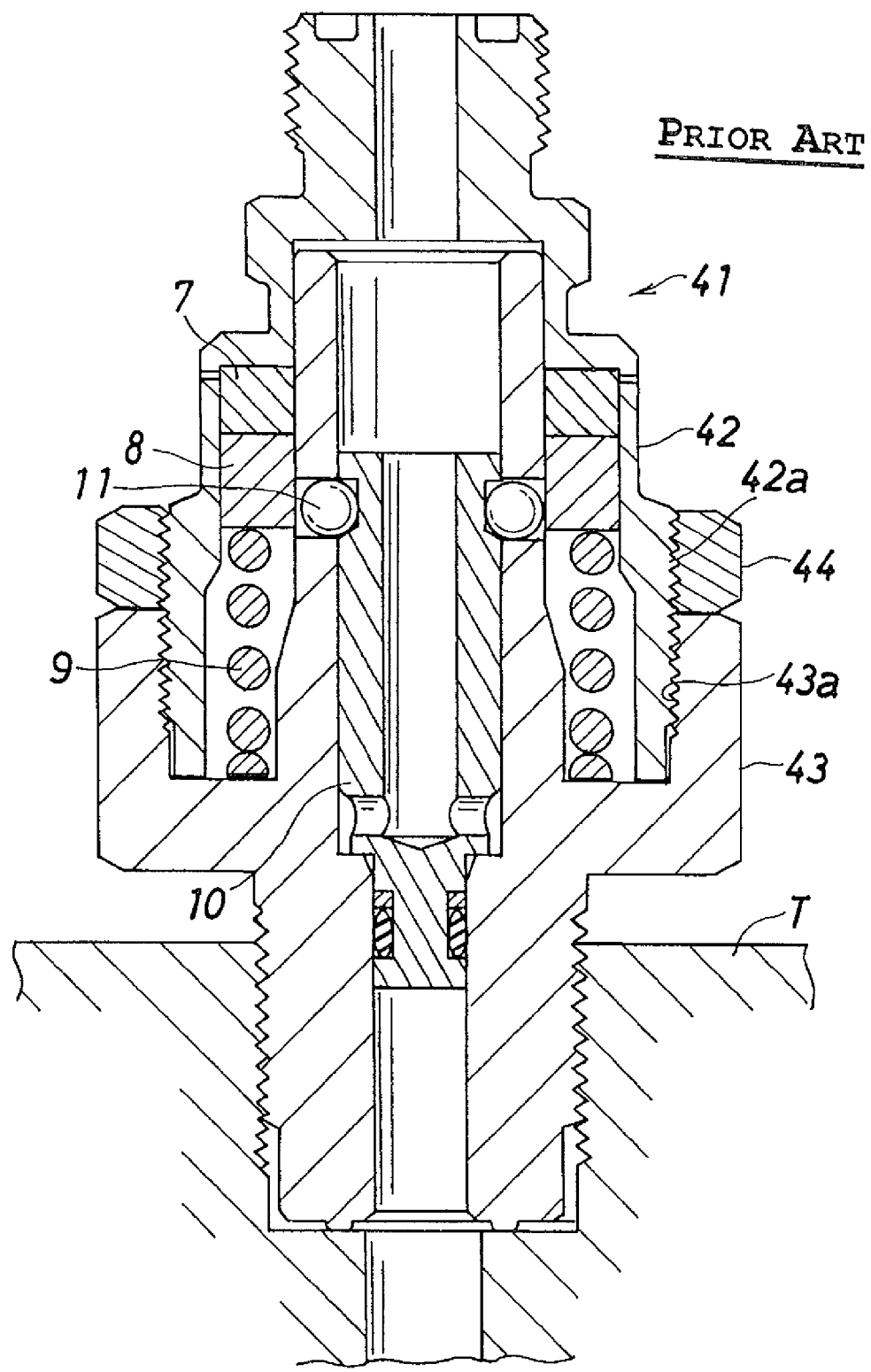
FIG. 3 is a cross-sectional view illustrating a conventional safety valve, illustrating a normal state (a closed state).

If the coupling between the main body (3) and the housing (2) through screws is loosened, namely if the housing (2) is moved upwardly with respect to the main body (3), the moving member (8) is moved upwardly along therewith, which may induce the same operation as that in the aforementioned operative state of the safety valve (malfunction). In the safety valve (41) illustrated in FIG. 3, the lock nut (44) is not prevented from being loosened due to vibrations and the like or by mistake, which may induce such a malfunction. However, with the safety valve (1) according to the present invention, the male screw members (34) are not exposed from the safety valve (1) at the state where the safety valve (1) is mounted, illustrated in FIG. 1, which completely eliminates the possibility that they are loosened by mistake, and, further, there is a small allowance for loosening of the male screw members (34) due to vibrations, thereby providing extremely excellent reliability.

INDUSTRIAL APPLICABILITY

According to the present invention, it is possible to improve safety of a safety valve mounted to a container for releasing gas within the container if a temperature thereof is raised and, therefore, it is possible to employ it for applications and the like for preventing pressures within containers from being excessively raised in the event of fire and the like, which contributes to the improvement of the safety.

The invention claimed is:
1. A safety valve comprising:
a gas releasing assembly formed by a main body mounted to a container and by a housing coupled to the main body, the gas releasing assembly including a fusible member which fuses at high temperatures and being adapted to release gas within the container along with the fusion of the fusible member, wherein the main body has a mounting portion inserted in an opening provided in the container and a large-diameter portion having an outer diameter larger than an outer diameter of the mounting portion, the housing is abutted, at a lower surface thereof, against an upper surface of the outer peripheral edge portion of the large diameter portion of the main body, the outer peripheral edge portion of the large-diameter portion of the main body is provided with a plurality of axial through holes, and the housing is provided, from the lower surface, with female screw portions conforming to the respective axial through holes and the main body and the housing are coupled to each other, through a plurality of screws which are inserted from a surface of an outer peripheral edge portion of the main body and screwed in female screw portions provided in the housing, wherein at a state where the safety valve is mounted to the container, the lower surface of the outer peripheral edge portion of the large-diameter portion is closely faced to a surface of the container so that there is a substantially zero slack allowance for loosening of the screws less than approximately one turn due to vibrations.

2. The safety valve according to claim 1, wherein the mounting portion of the main body is provided with a male screw portion at an outer periphery thereof, and is inserted in the opening provided in the container to be screwed in a female portion provided therein, the large-diameter portion of the main body has an outer diameter larger than an outer diameter of the mounting portion, a lower surface of the outer peripheral edge portion of the large-diameter portion is faced to the surface of the container with a small gap interposed therebetween at a state where the safety valve is mounted to the container, and the large-diameter portion of the main body is provided, at the outer periphery, with an engagement portion with a hexagonal cylindrical shape which fits, thereto, a torque wrench of a box-wrench type, so that the main body and the housing, coupled to each other through the plurality of male screws, are detachably mounted to the container.

3. A safety valve for coupling to a container to release liquid within the container, wherein the container defines an opening surrounded by a container surface, the safety valve comprising:

a housing defining an interior containing a fusible member for actuating a plug between a closed position and an open position to release the liquid upon melting the fusible member; and a main body having a first end for coupling to the housing and a second end for coupling to the opening of the container, wherein the second end includes a main body surface defining at least one axial bore for receiving at least one screw to fix the main body to the housing such that upon coupling the safety valve to the container, a small gap is formed between the container surface and the main body surface to limit loosening of the at least one screw to approximately one turn or less and, in turn, limit malfunction of the safety valve.

4. A safety valve for coupling to a container to release fluid in the container, wherein the container has an end surface defining an opening, the safety valve comprising:

a housing defining an interior containing a member for actuating between a closed position and an open position to release the fluid upon melting the fusible member; and a main body having a first end for coupling to the housing and a second end for coupling to the opening of the container, wherein the second end includes a main body surface defining a plurality of axial bores, each bore for receiving a screw to fix the main body to the housing such that upon coupling the main body to the container, a small slack allowance is formed between the end surface and the main body surface to limit loosening of the screws to less than a rotation so that undesirable release of the fluid is prevented.

* * * * *